United States Patent [19]
Wada et al.

[11] Patent Number: 5,394,538
[45] Date of Patent: Feb. 28, 1995

[54] MEMORY SELECTION CIRCUIT FOR SELECTING ONE OF VARIOUS MEMORY AREAS IN A MEMORY UNIT BASED ON THE CAPACITY AND THE STARTING ADDRESS OF EACH AREA

[75] Inventors: Masahiko Wada, Tenri; Shigeki Imai, Nara, both of Japan

[73] Assignee: Sharp Kabushiki Kaisha, Osaka, Japan

[21] Appl. No.: 216,519

[22] Filed: Mar. 23, 1994

Related U.S. Application Data

[63] Continuation of Ser. No. 672,667, Mar. 21, 1991, abandoned.

[30] Foreign Application Priority Data

Mar. 29, 1990 [JP] Japan .................. 2-83460

[51] Int. Cl.[6] .................. G06F 12/00; G06F 13/00
[52] U.S. Cl. .................. 395/425; 364/DIG. 1; 364/245; 364/246.7; 364/970
[58] Field of Search .................. 395/425; 364/200 MS File, 900 MS File; 245, 245.4, 246.7, 970

[56] References Cited

U.S. PATENT DOCUMENTS

| | | | |
|---|---|---|---|
| 4,303,993 | 12/1981 | Panepinto et al. | 365/230 |
| 4,507,730 | 3/1985 | Johnson et al. | 364/200 |
| 4,571,676 | 2/1986 | Mantellina et al. | 364/200 |
| 4,592,011 | 5/1986 | Mantellina et al. | 364/200 |
| 4,740,916 | 4/1988 | Martin | 364/900 |
| 4,744,025 | 5/1988 | Lipcon et al. | 364/200 |
| 4,908,789 | 3/1990 | Blokkum et al. | 364/900 |
| 4,951,248 | 8/1990 | Lynch | 364/900 |
| 5,027,313 | 6/1991 | Culley | 364/900 |

FOREIGN PATENT DOCUMENTS

62-79544 4/1987 Japan .

Primary Examiner—Joseph L. Dixon
Assistant Examiner—Frank J. Asta
Attorney, Agent, or Firm—Nixon & Vanderhye

[57] ABSTRACT

A memory selection circuit of a computer provided with a central processing unit and a plurality of memory areas of an equal capacity, including the first circuit for storing data corresponding to the capacity of the plurality of memory areas outputted from the central processing unit, the second circuit for storing an address outputted from the central processing unit, the third circuit for generating a signal that indicates a difference between the address stored in the second circuit and a predetermined address assigned to a beginning of the plurality of memory areas; and the fourth circuit for generating a selection signal for selecting one of the plurality of memory areas on the basis of the data stored in the first circuit and the signal generated by the third circuit.

12 Claims, 6 Drawing Sheets

MEMORY SELECTION CIRCUIT FOR SELECTING ONE OF VARIOUS MEMORY AREAS IN A MEMORY UNIT BASED ON THE CAPACITY AND THE STARTING ADDRESS OF EACH AREA

This is a continuation of application Ser. No. 07/672,667, filed March 21, 1991, now abandoned.

BACKGROUND OF THE INVENTION

1. Field of the Invention

The present invention relates to a memory selection circuit for selecting an area to be written/read into or from a memory which is formed of a plurality of divided memory areas.

2. Description of the Related Art

Figure 5:
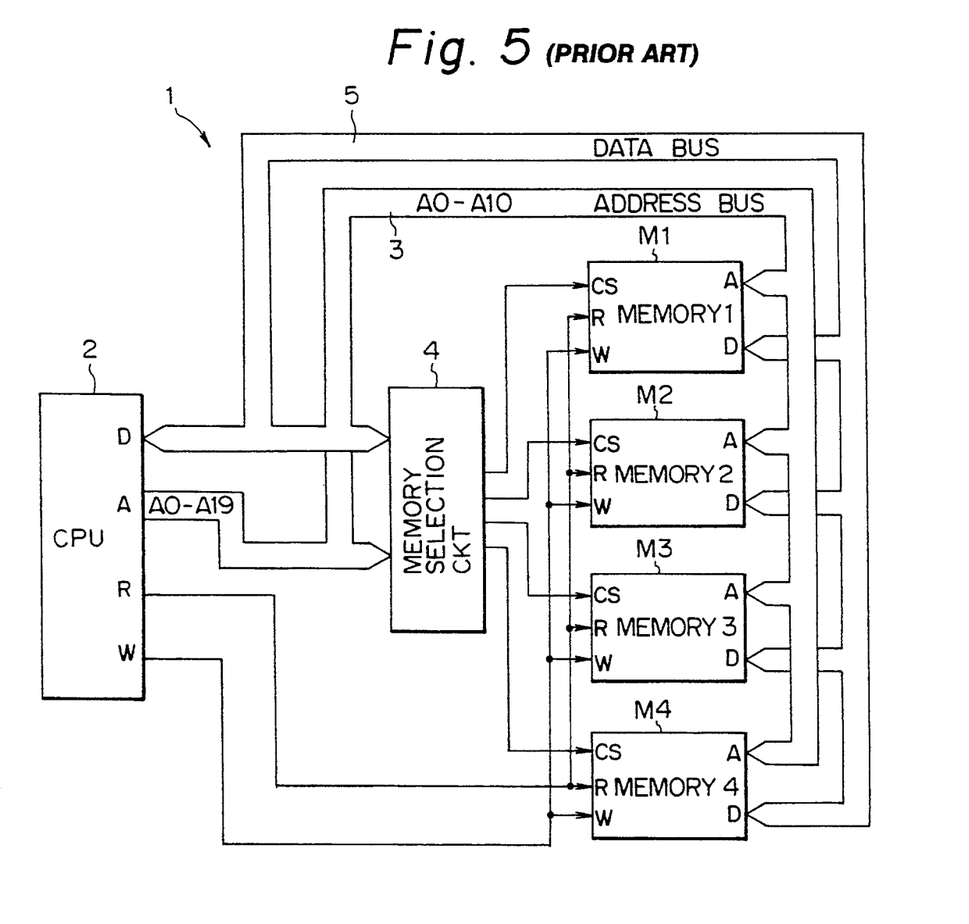
FIG. 5 is a block diagram of a microcomputer equipped with a conventional memory selection circuit.

FIG. 5 is a block diagram showing an example of the construction of a microcomputer 1 equipped with a conventional memory selection circuit. The microcomputer 1 has memories M1, M2, M3, and M4 all of which have the same memory capacity. A writing/reading operation of the microcomputer 1 is controlled by its central processing unit (hereinafter abbreviated as CPU). In the following explanation, it is assumed that each memory M1 to M4 has a memory capacity of 2K bytes and has an address range shown in Table 1 below.

TABLE 1

| Memory | | Address Range |
|---|---|---|
| | M1 | 00000<br>\|<br>007FF |
| | M2 | 00800<br>\|<br>00FFF |
| | M3 | 81000<br>\|<br>817FF |
| | M4 | 81800<br>\|<br>81FFF |

In this description, in a case where a CPU 2 outputs a 20-bit (A0 to A19) address, an address bus 3, which is directly connected between each of the memories M1, M2, M3, and M4 and the CPU 2, is formed from 11 signal lines for bits A0 to A10. The remaining upper-order bits A11 to A19 are inputted to a memory selection circuit 4, and selection signals CS1, CS2, CS3 and CS4, for respectively selecting memories M1 to M4, are respectively inputted to the memories M1 to M4. That is, regarding an address supplied to each memory M1 to M4, the lower-order bits A0 to A10 are supplied in common to the memories M1 to M4, and one of the selection signals CS1, CS2, CS3 and CS4 is outputted. As a result, one of the corresponding memories M1 to M4 is accessed by the lower-order bits A0 to A10.

Data that is written/read is inputted and outputted between the CPU 2 and the memories M1 to M4 via a data bus 5. The CPU 2 outputs a write control signal W and a read control signal R for switching each of the memories M1 to M4 between a write state and a read state. These control signals W and R can be inputted to the memories M1 to M4 respectively selected by one of the selection signals CS1, CS2, CS3 and CS4.

In the microcomputer 1, the memory selection circuit 4, which outputs one of the selection signals CSi (i=1 to 4), depending on the content of the upper-order bits A11 to A19 of an address signal received from the CPU 2, has a circuit arrangement corresponding to each respective capacity of the memories M1 to M4.

Accordingly, if each respective capacity of the memories M1 to M4 is changed from 2K bytes to, for example, 1K or 4K bytes, the circuit arrangement of the memory selection circuit 4 must be changed so as to correspond to the new memory capacity. That is, in developing the microcomputer 1, the memory selection circuit 4 of the type which corresponds to each kind of expected memory capacity needs to be prepared. Hence, much labor and time are required to develop the microcomputer 1 and problems arise in that the manufacture thereof takes time and the number of parts required increases.

SUMMARY OF THE INVENTION

An object of the present invention is to provide a memory selection circuit which solves the above-mentioned problems and can successively change a memory capacity without changing its circuit arrangement.

The above-mentioned object of the present invention can be achieved by a memory selection circuit of a computer provided with a central processing unit and a plurality of memory areas of an equal capacity, comprising:

first means for storing data corresponding to said capacity of said plurality of memory areas outputted from said central processing unit;

second means for storing an address outputted from said central processing unit;

third means for generating a signal that indicates a difference between said address stored in said second means and a predetermined address assigned to a beginning of said plurality of memory areas; and fourth means for generating a selection signal for selecting one of said plurality of memory areas on the basis of said data stored in said first means and said signal generated by said third means.

According to the present invention, in developing a microcomputer, since a memory selection circuit which corresponds to each kind of expected memory capacity does not need to be prepared as in the prior art, the time required to develop a microcomputer and manufacturing costs are reduced.

Further objects and advantages of the present invention will be apparent from the following description, when reference is made to the accompanying drawings wherein a preferred embodiment of the present invention is clearly shown.

DESCRIPTION OF THE PREFERRED EMBODIMENT

Figure 1:
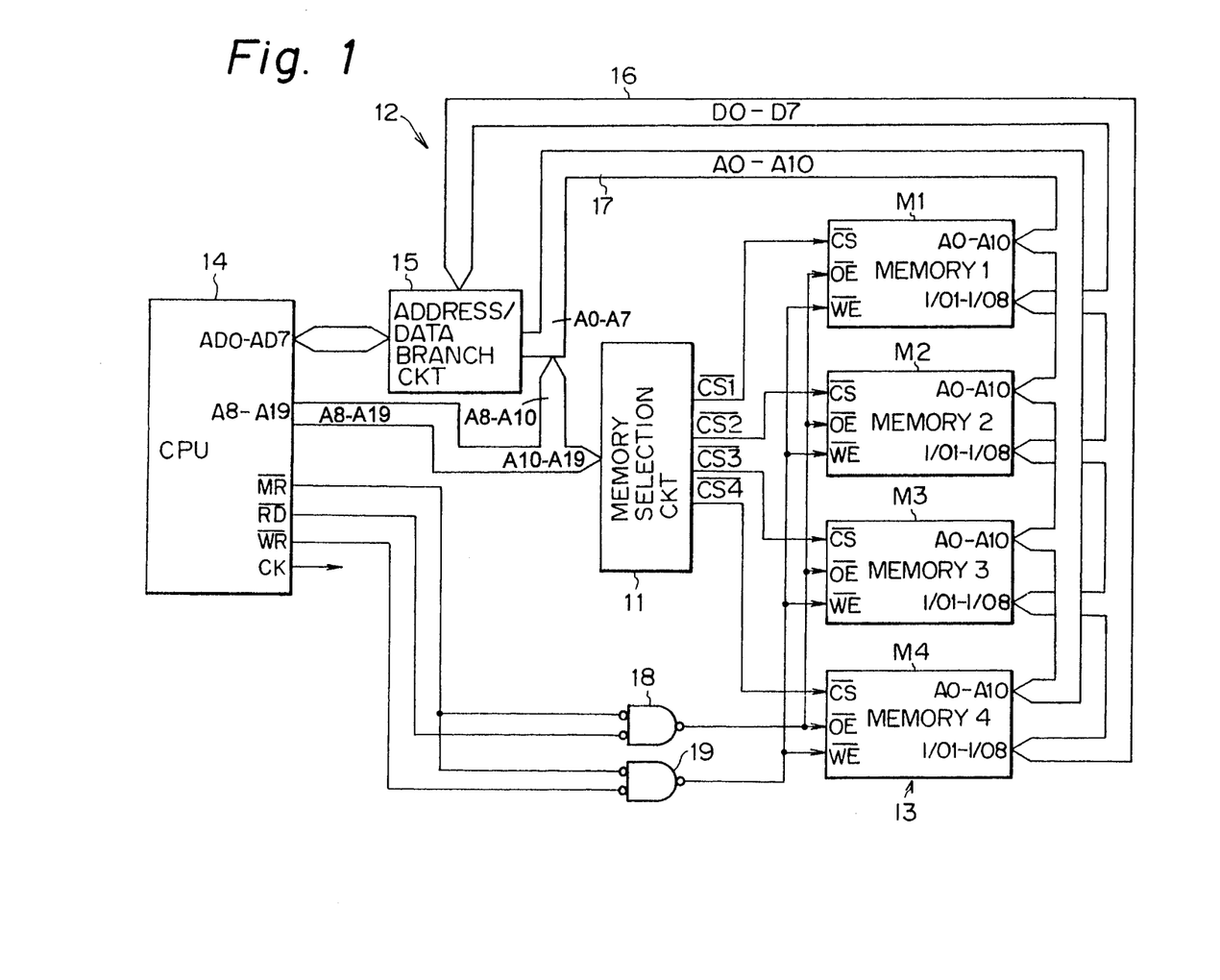
FIG. 1 is a block diagram showing an example of the construction of a microcomputer equipped with a memory selection circuit of an embodiment of the present invention.

FIG. 1 is a block diagram showing an example of the construction of a microcomputer 12 containing a memory selection circuit 11 of the present invention. The microcomputer 12 has memory elements M1 to M4 (collectively referred to by reference character M) having the same capacity. These memory elements M1 to M4 together form a memory means 13 having a single memory space.

A CPU 14 outputs data AD0 to AD7 which serves as an address for memories M1 to M4 and as data which is written/read. Data ADO to AD7 are separated into address and data at a predefined time-sharing timing by an address/data branch circuit and are outputted individually to a data bus 16 or an address bus 17. In the following explanation, it is assumed that the memory capacity of each of the memories M1 to M4 is, for example, 2K bytes. The data bus 16 is formed of 8 signal lines, the address bus 17 being formed of 11 signal lines. That is, input and output data IO0 to IO8 are inputted/outputted to the memories M1 to M4 via the data bus 16. Also, the lower-order bits A0 to A10 of the address are inputted to the memories M1 to M4 via the address bus 17.

The CPU 14 outputs the upper-order bits A11 to A19 of the address to the address bus 17 in addition to the above data AD0 to AD7. In other words, the CPU 14 outputs data AD0 to AD7 as the lower-order 8 bits of an address and the upper-order 12 bits A8 to A19 of the address. Therefore, it follows that the CPU 14 outputs an address specified by a total of 20 bits A0 to A19. The upper-order bits A8 to A19 are inputted to the memory selection circuit 11. A part of the bits A8 to A19 branch to the address bus 17 and are added to an 8-bit (AD0 to AD7) data. As a result, an 11-bit (A0 to A10) address is formed.

The CPU 14 inverts a memory access signal $\overline{MR}$ and inputs it to NAND circuits 18 and 19. A read control signal $\overline{RD}$ is further inputted to the NAND circuit 18; a write control signal $\overline{WR}$ is further inputted to the NAND circuit 19. Outputs from these NAND circuits 18 and 19 are each inputted to the memories M1 to M4 as an output enable signal $\overline{OE}$ and a write enable signal $\overline{WE}$, respectively.

Figure 2:
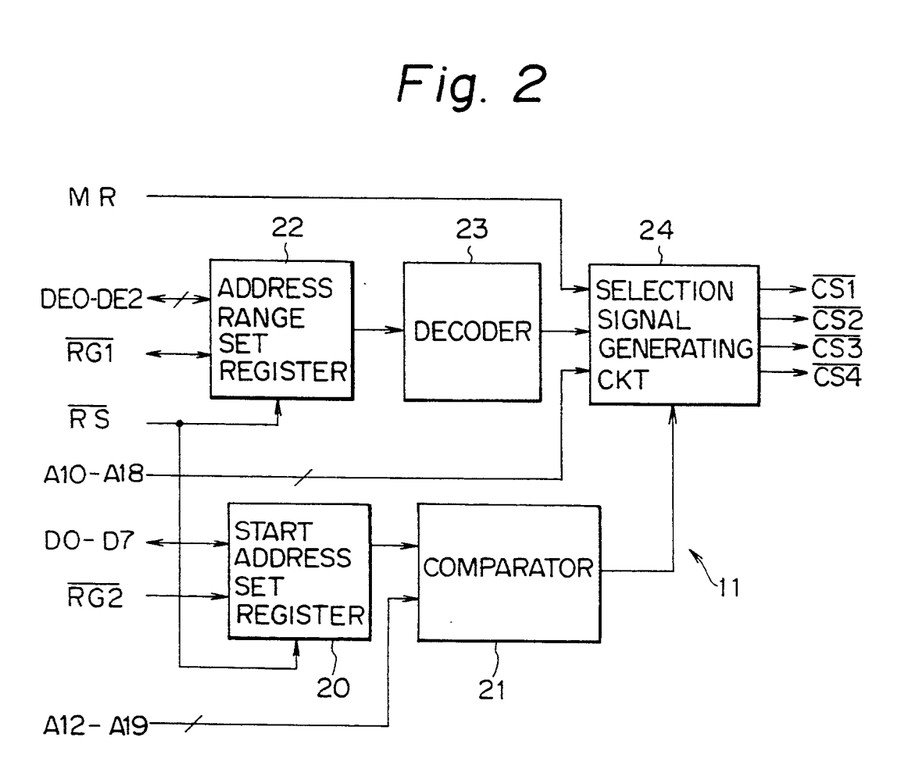
FIG. 2 is a block diagram showing a basic construction of the memory selection circuit of FIG. 1.

FIG. 2 is a block diagram showing the construction of the memory selection circuit 11.

In the microcomputer 12, it is sometimes necessary to make the address at the beginning of the memory means 13 correspond to a start address different from 00000H. For this reason, a start address setting register for making the address at the beginning of the memory means 13 correspond to a start address is disposed. A start address setting register 20 sets the upper-order 8 bits (A12 to A19) of an access start address of the memory means 13 on the basis of an 8-bit data D0 to D7. $\overline{RG2}$ denotes a latch signal.

The output from the start address setting register 20 is compared with the upper-order 8 bits A12 to A19 of an address which is separately inputted from the CPU 14 in a comparison circuit 21, and a difference between the access start address and the address specified by bits A12 to A19 is outputted. If a reset signal $\overline{RS}$ is inputted to the start address setting register 20, its output is set at 00H.

Reference numeral 22 denotes an address range setting register for storing address range data DE0 to DE2 for setting a range of an address for one memory. The address range data DE0 to DE2 each have a value corresponding to the capacity of each memory. An address range setting register 22 latches the address range data DE0 to DE2 at the timing of a latch signal $\overline{RG1}$. The output from the address range setting register 22 is inputted to a decoder 23. The decoder 23 outputs a signal for selecting bits used for setting the address range from among bits A10 to A18. The outputs of the comparison circuit 21 and the decoder 23, and a memory access signal $\overline{MR}$, are inputted to a selection signal generating circuit 24. The selection signal generating circuit 24 outputs one of the selection signals $\overline{CS1}$ to $\overline{CS4}$ on the basis of these signals.

Figures 3, 3A:
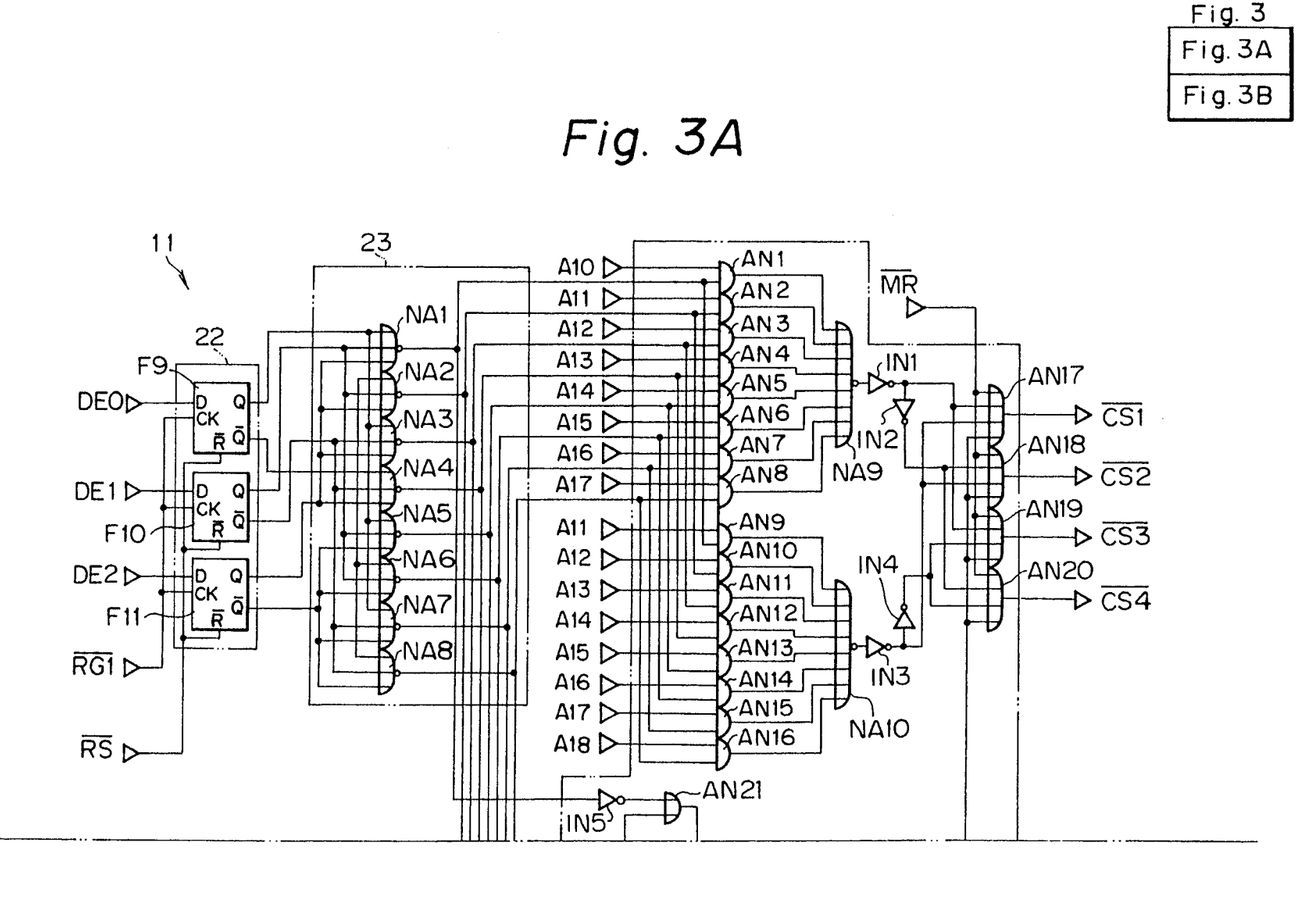
FIG. 3a and 3b is a circuit diagram showing a specific construction of the memory selection circuit of FIG. 2.
Figure 3B:
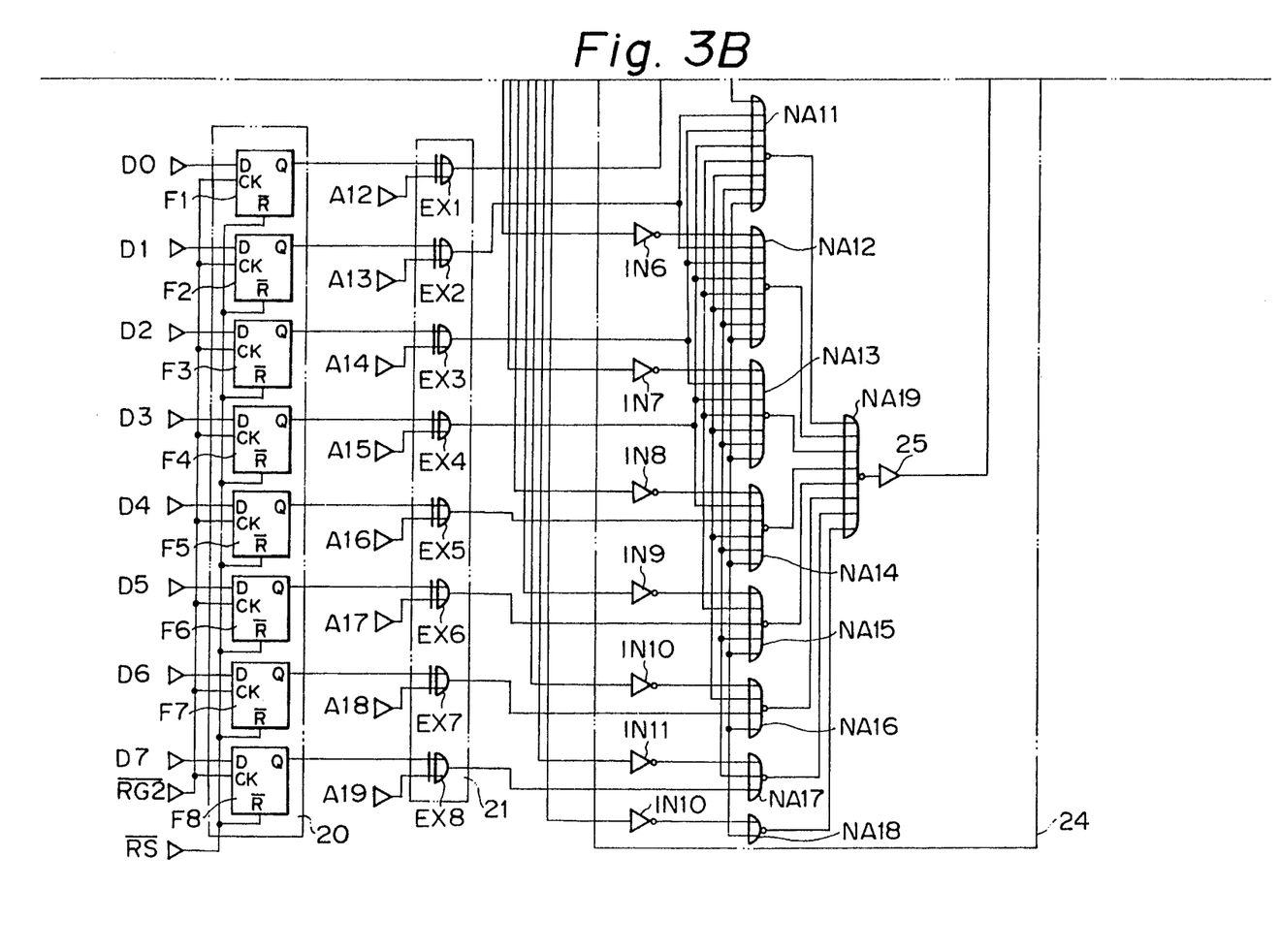

FIG. 3 is a circuit diagram showing a specific construction of the memory selection circuit 11. The start address setting register 20 is comprised of flip-flop circuits F1 to F8 respectively corresponding to each bit D0 to D7. The above-mentioned latch signal $\overline{RG2}$ is inputted to each clock input terminal CK. A reset signal $\overline{RS}$ is inputted to each reset input terminal $\overline{R}$. The comparison circuit 21 is comprised of 8 exclusive OR circuits EX1 to EX8. It compares the output from each of the flip-flop circuits F1 to F8 individually with the upper-order 8 bits A12 to A19 of the address.

Meanwhile, the address range setting register 22 is comprised of 3 flip-flop circuits F9 to F11 in correspondence with address range data DE0 to DE2. The latch signal $\overline{RG1}$ is inputted to each clock input terminal CK. The reset signal $\overline{RS}$ is inputted to each reset input terminal. The decoder 23 is comprised of 8 NAND circuits NA1 to NA8. The output Q and inverted output $\overline{Q}$ from the flip-flop circuit F9 are inputted to NAND circuits NA1, NA3, NA5 and NA7, and NAND circuits NA2, NA4, NA6 and NA8, respectively. Also, the output Q and inverted output $\overline{Q}$ from the flip-flop circuit F10 are inputted to NAND circuits NA1, NA2, NA5 and NA6, and NAND circuits NA3, NA4, NA7 and NA8, respectively. In addition, the output Q and inverted output $\overline{Q}$ from the flip-flop circuit F11 are inputted to NAND circuits NA1, NA2, NA3 and NA4, and NAND circuits NA5, NA6, NA7 and NA8, respectively.

The selection signal generating circuit 24 is comprised of AND circuits AN1 to AN8 to which the output of each of the NAND circuits NA1 to NA8 is inputted respectively. Bits A10 to A17 are respectively inputted to the AND circuits AN1 to AN8, their outputs being commonly inputted to the NAND circuit NA9. The selection signal generating circuit 24 is comprised of AND circuits AN9 to AN16 to which the output of each of the NAND circuits NA1 to NA8 is inputted respectively. Bits A11 to A18 are respectively inputted to the AND circuits AN9 to AN16, their outputs of these AND circuits being commonly inputted to the NAND circuit NA10.

The output of the NAND circuit NA9 is inverted by an inversion circuit IN1 and inputted to AND circuits AN17 and AN19. Furthermore, it is inverted by an inversion circuit IN2 and inputted to AND circuits AN18 and AN20. The output of the NAND circuit NA10 is inverted by an inversion circuit IN3 and inputted to AND circuits AN17 and AN18. Furthermore, it is inverted by an inversion circuit IN4 and inputted to AND circuits AN19 to AN20. The above memory access signal $\overline{MR}$ is commonly inputted to AND circuits AN17 to AN20.

The output of the NAND circuit NA1 of the decoder 23 is inverted by the inversion circuit IN5 and inputted to an AND circuit AN21 together with the output of the exclusive OR circuit EX1 of the comparison circuit 21. The output of the AND circuit AN21 is inputted to a NAND circuit NA11. The outputs of the remaining NAND circuits NA2 to NA8 of the decoder 23 are inverted by inversion circuits IN6 to IN12 and respectively inputted to the NAND circuits NA12 to NA18.

Meanwhile, the outputs of the exclusive OR circuits EX1 to EX8 are supplied to the NAND circuit NA11 of the selection signal generating circuit 24; the outputs of the exclusive OR circuits EX3 to EX8 are supplied to the NAND circuit NA12. In the same way as above, a part or all of the outputs of the exclusive OR circuits EX3 to EX8 are supplied to each of the NAND circuits NA13 to NA18. The output of each of the NAND circuits NA11 to NA18 is supplied to a NAND circuit NA19. The output of the NAND circuit NA19 is supplied to the AND circuits AN17 to AN20 via a buffer 25. The outputs of the AND circuits AN17 to AN20 are respectively outputted as selection signals $\overline{CS1}$ to $\overline{CS4}$.

Where the memory capacity of each of the memories M1 to M4 is 2K bytes, the number of address lines required for each memory M1 to M4 is 11. These address lines carry bits A0 to A10. The number of address lines increases as the capacity increases, as follows: The number of address lines is 12 (bits A0 to A11) in the case of 4K bytes and 13 (bits A0 to A12) in the case of 8K bytes.

The start address setting register 20 sets the upper-order 8 bits A12 to A19 on the basis of data D0 to D7. As a result, a control start address in the memory means 13 can be set at any value in increments of 4K bytes beginning at 00000H. If a reset signal $\overline{RS}$ is inputted to the latch circuit 20, the control start address is set at 00000H.

In the present embodiment, memories M1 to M4 having a capacity of 2K bytes are used. Although the range of an address for a single memory is therefore 2K bytes, the range of an address can be changed to one of eight kinds from 1K bytes to 128K bytes by changing the value of the address range data DE0 to DE2, as shown in Table 2.

TABLE 2

| DE2 | DE1 | DE0 | Condition |
|---|---|---|---|
| 0 | 0 | 0 | Units of 1K byte |
| 0 | 0 | 1 | Units of 2K bytes |
| 0 | 1 | 0 | Units of 4K bytes |
| 0 | 1 | 1 | Units of 8K bytes |
| 1 | 0 | 0 | Units of 16K bytes |
| 1 | 0 | 1 | Units of 32K bytes |
| 1 | 1 | 0 | Units of 64K bytes |
| 1 | 1 | 1 | Units of 132K bytes |

Figure 4:
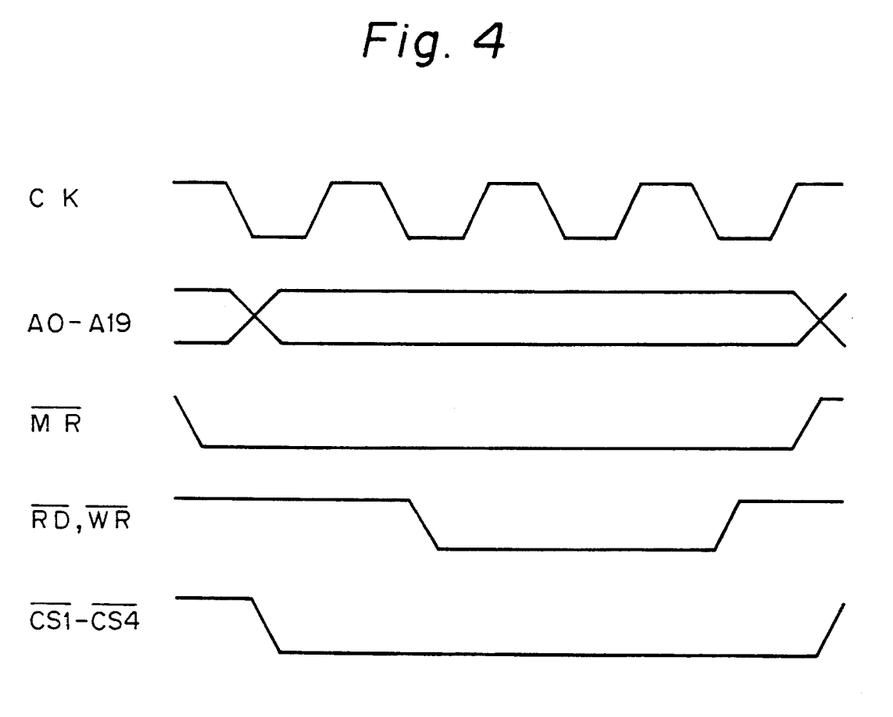
FIG. 4 is a timing chart showing the memory selection operation of the microcomputer of FIG. 1.

FIG. 4 is a timing chart showing the memory selection operation of the microcomputer of the present embodiment. After the memory access signal $\overline{MR}$ is outputted in a state in which a clock signal CK is being outputted from the CPU 14, address bits A0 to A19 are outputted. At this time, bits A12 to A19 are inputted to the comparison circuit 21, bits A10 to A18 being inputted to the decoder 23. From the CPU 14, the latch signal $\overline{RG2}$ is inputted to the start address setting register 20. At this point, in a case where the access start address of the memory means 13 is set at 8000H, data D0 to D7 are set at 10000000, i.e., 80H. In a case where the access start address is set at 00H, the reset signal $\overline{RS}$ is inputted to the start address setting register 20.

The address range setting register 22 latches the address range data DE0 to DE2 by the latch signal $\overline{RG1}$ and supplies it to the decoder 23. One of the selection signals $\overline{CS1}$ to $\overline{CS4}$ is outputted to the memory means 13 from the selection signal generation circuit 24 on the basis of the output of the decoder 23, the output of the comparison circuit 21, and bits A10 to A18, whereby one of the memories M1 to M4 is specified. At this time, the output signal is supplied in common to the memories M1 to M4 within the bits A0 to A19 to correspond with each respective capacity of each of the memories M1 to M4, as shown in Table 3. Bits vary between bits A0 to A9 and bits A0 to A16. Two bits to be decoded for the purpose of outputting one of the selection signals $\overline{CS1}$ to $\overline{CS4}$ vary according to Table 3.

TABLE 3

| Memory Capacity | Common Bits | Bits to be decoded |
|---|---|---|
| Units of 1K byte | A0 to A9 | A11, A10 |
| Units of 2K bytes | A0 to A10 | A12, A11 |
| Units of 4K bytes | A0 to A11 | A13, A12 |
| Units of 8K bytes | A0 to A12 | A14, A13 |
| Units of 16K bytes | A0 to A13 | A15, A14 |
| Units of 32K bytes | A0 to A14 | A16, A15 |
| Units of 64K bytes | A0 to A15 | A17, A16 |
| Units of 128K bytes | A0 to A16 | A18, A17 |

When each of the memory capacities is 1K byte, the address range of each of the memories M1 to M4 is as shown in Table 4 below in hexadecimal. In the binary representation, it is as shown in Table 5 below.

TABLE 4

| Memory Capacity | Address Range (Hexadecimal) |
|---|---|
| $\overline{CS1}$ | 80000H to 803FFH |
| $\overline{CS2}$ | 80400H to 807FFH |
| $\overline{CS3}$ | 80800H to 80BFFH |
| $\overline{CS4}$ | 80C00H to 80FFFH |

TABLE 5

| Selection Signal | Address Range (Binary) | | |
|---|---|---|---|
| | A19←    | →A0 | |
| $\overline{CS1}$ | 00 00 00 | 00 00 00 00 00 00 00B | ~ 00 00 00 00 00 11 11 11 11 11B |
| $\overline{CS2}$ | 00 00 00 | 00 01 00 00 00 00 00B | ~ 00 00 00 00 01 11 11 11 11 11B |
| $\overline{CS3}$ | 00 00 00 | 00 10 00 00 00 00 00B | ~ 00 00 00 00 10 11 11 11 11 11B |

TABLE 5-continued

| Selection Signal | Address Range (Binary) | |
|---|---|---|
| $\overline{CS4}$ | 00 00 00  00 11 00 00 00 00 00B | ~ 00 00 00 00 11 11 11 11 11 11B |

As shown in Table 5, when each memory capacity is 1K byte, bits used to specify the memories M1 to M4 from among the bits A0 to A19 are A11 and A10. Table 6 shows how each address range of each selection signal $\overline{CS1}$ to $\overline{CS4}$ is made to correspond to respective memory capacities of each said selecting signal.

TABLE 6

| | Beginning Address (Upper Row), Last Address (Lower Row) of Selection Signal | | | | | | | | |
|---|---|---|---|---|---|---|---|---|---|
| Selection Signal | At Reset | Units of 1KB | Units of 2KB | Units of 4KB | Units of 8KB | Units of 16KB | Units of 32KB | Units of 64KB | Units of 128KB |
| $\overline{CS1}$ | 00000 003FF | 80000 803FF | 80000 807FF | 80000 80FFF | 80000 81FFF | 80000 83FFF | 80000 87FFF | 80000 8FFFF | 80000 9FFFF |
| $\overline{CS2}$ | 00400 007FF | 80400 807FF | 80800 80FFF | 81000 81FFF | 82000 83FFF | 84000 87FFF | 88000 8FFFF | 90000 9FFFF | A0000 BFFFF |
| $\overline{CS3}$ | 00800 00BFF | 80800 80BFF | 81000 817FF | 82000 82FFF | 84000 85FFF | 88000 8BFFF | 90000 97FFF | A0000 AFFFF | C0000 DFFFF |
| $\overline{CS4}$ | 00C00 00FFF | 80C00 80FFF | 81800 81FFF | 83000 83FFF | 86000 87FFF | 8C000 8FFFF | 98000 9FFFF | B0000 BFFFF | E0000 FFFFF |

(Numeric values: hexadecimal, KB: kilo bytes)

As has been explained above, in the present embodiment, even when the memory capacity of each respective memory M1 to M4 is changed to have two or more different memory capacities, the memory selection circuit having the circuit configuration shown in FIGS. 1 to 3 can perform address control suiting the memory capacity.

Each of the memories M1 to M4 in the above-mentioned embodiment may be a single memory element or may be formed of a plurality of memory elements. In addition, each of the memories may be a memory area which is set in a single memory element.

Many widely different embodiments of the present invention may be constructed without departing from the spirit and scope of the present invention. It should be understood that this present invention is not limited to the specific embodiments described in this specification, except as defined in the appended claims.

What is claimed is:

1. A memory selection circuit of a computer provided with a central processing unit and a memory unit divided into a plurality of memory areas of an equal capacity to be accessed by common lower bits of an address sent from the central processing unit, comprising:

memory capacity storing means for storing capacity data corresponding to said equal capacity of each of said plurality of memory areas, said capacity data being rewritable by signals from the central processing unit;

decoder means for decoding said stored capacity data to generate bit selecting signals;

start address storing means for storing upper bits of a predetermined start address assigned to a beginning of said memory unit, said upper bits being rewritable by signals from central processing unit;

means for comparing bit by bit, upper bits of an address output from said central processing unit and the stored upper bits of said predetermined start address and generating a comparison signal representing a result of each comparison; and means for generating a selection signal for selecting one of said plurality of memory areas on the basis of the stored capacity data and said comparison signal, said generating means including:

bit selecting means for selecting which address bits to decode based on said bit selection signals, logic gate means connected to receive said comparison signal and said bit selecting signals for generating a signal representing that the address sent from the central processing unit is in a valid address range starting with said predetermined start address, and decoding gate means connected to receive said selected address bits and said signal from said logic gate means for decoding said selected address bits to generate said selection signal if the address is in said valid address range.

2. A memory selection circuit as claimed in claim 1, wherein said computer is a microcomputer formed in a single semiconductor chip.

3. A memory selection circuit as claimed in claim 1, wherein all of said memory areas are formed in a single memory element.

4. A memory selection circuit as claimed in claim 1, wherein each of said memory areas is formed in an individual single memory element.

5. A memory selection circuit as claimed in claim 1, wherein each of said memory areas is formed of a plurality of memory elements.

6. A memory selection circuit as claimed in claim 1, wherein said memory capacity storing means includes a plurality of flip-flop circuits connected to receive said data corresponding to said equal capacity of each memory area.

7. A memory selection circuit as claimed in claim 1, wherein said bit selecting means includes a plurality of gates connected to receive said bit selecting signals and address bits to be selected.

8. A memory selection circuit as claimed in claim 7, wherein said plurality of gates are divided into two groups to select adjacent two bits of the address, one group being for one bit and the other group being for the other bit.

9. A memory selection circuit as claimed in claim 1, wherein said comparing means includes a plurality of exclusive OR gates connected to receive said upper bits of the address output from the central processing unit and the data stored in said start address storing means.

10. A memory selection circuit as claimed in claim 9, wherein said logic gate means includes a plurality of gates connected to receive signals from said exclusive OR gates and signals from said decoder means.

11. A memory selection circuit as claimed in claim 10, wherein said logic gate means includes a gate connected to receive signals from said plurality of gates of said logic gate means to generate a signal to be supplied to said decoding gate means if the address is in said valid address range.

12. A memory selection circuit as claimed in claim 1, wherein said start address storing means includes a plurality of flip-flops.

* * * * *